United States Patent [19]

Kleinhagen, Jr.

[11] Patent Number: 4,632,229
[45] Date of Patent: Dec. 30, 1986

[54] AUTOMATIC BRAKE SLACK ADJUSTER

[75] Inventor: Charles W. Kleinhagen, Jr., Battle Creek, Mich.

[73] Assignee: Eaton Corporation, Cleveland, Ohio

[21] Appl. No.: 790,676

[22] Filed: Oct. 23, 1985

[51] Int. Cl.$^4$ .............................................. F16D 65/56
[52] U.S. Cl. ................................ 188/196 D; 188/71.9
[58] Field of Search ....... 188/196 D, 196 BA, 196 V, 188/343, 79.5 GE, 71.9, 196 P

[56] References Cited

U.S. PATENT DOCUMENTS 4,085,830  4/1978  Bottoms et al. ................. 188/196 D
4,351,419  9/1982  Garrett et al. ............. 188/196 D X
4,394,890  7/1983  Kleinhagen, Jr. ................. 188/71.9

Primary Examiner—Duane A. Reger
Assistant Examiner—Michael P. Gilday
Attorney, Agent, or Firm—C. H. Grace; A. E. Chrow

[57] ABSTRACT

An automatic slack adjuster (60) employs a drive member (22) having a helical groove (28) into which a pin (42) extends from a fixed frame (10) to transfer a rotational torque to a reaction member (30) secured to an adjustment nut member (12) for rotating and enabling nut member (12) upon application of the brake to advance a thrust member (2) threadingly engaged with nut member (12) a distance sufficient to maintain a substantially constant clearance between a frictional layer (5) and a surface (6) to be braked. An engagement means such as frictional layer (33) is disposed between drive member (22) and reaction member (30) and groove 28 is provided with an inclination angle ($\theta$) such that the combination enables slippage to occur between members (22) and (30) upon engagement between surface (6) and frictional layer (5).

9 Claims, 3 Drawing Figures

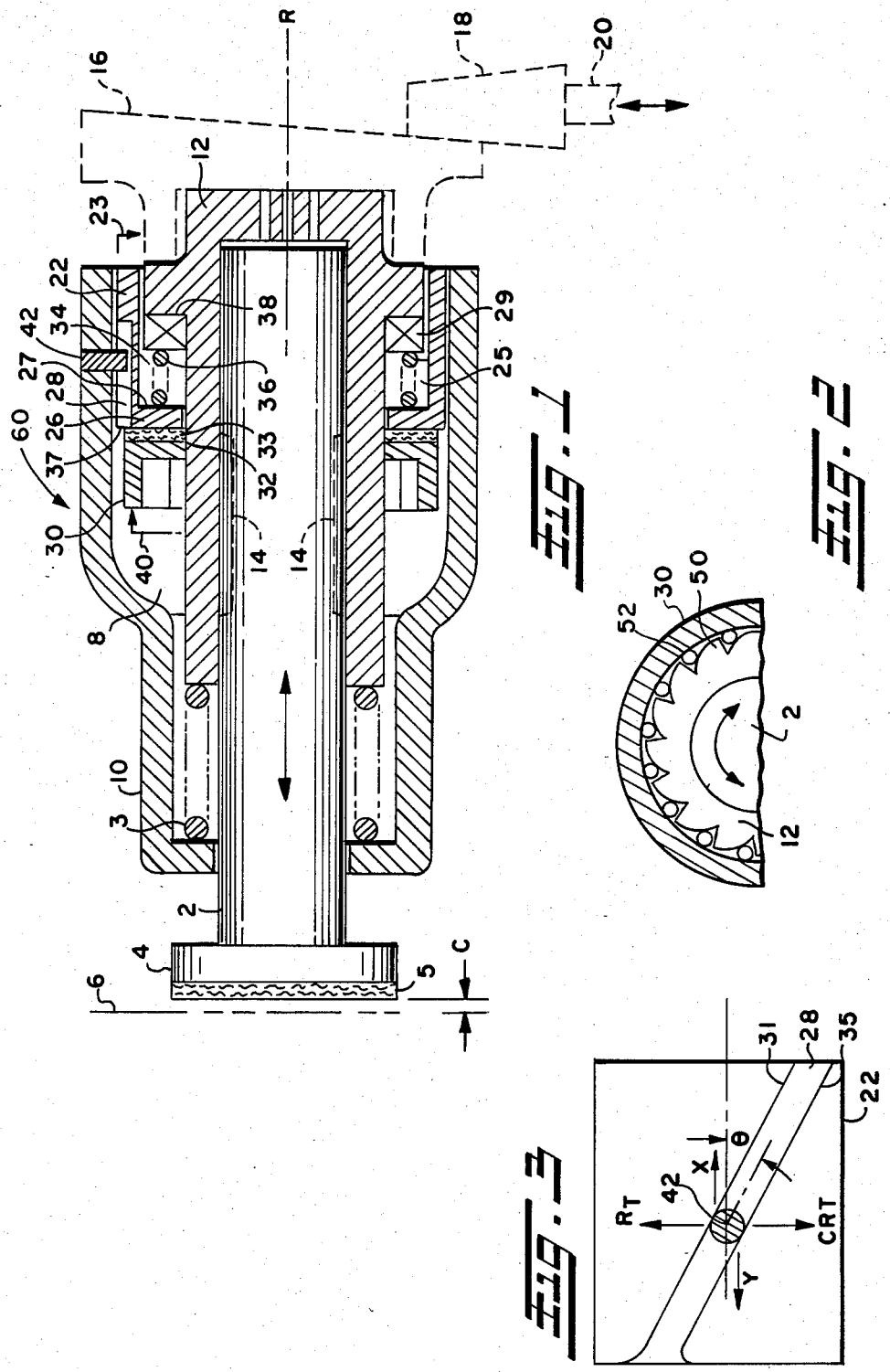

AUTOMATIC BRAKE SLACK ADJUSTER

INTRODUCTION

This invention relates generally to an automatic slack adjuster for maintaining a substantially constant clearance between a braking member and a rotatable braking surface in a brake released condition and more particularly to a low cost automatic slack adjuster particularly adapted for use in conjunction with a brake assembly having a thrust member that is operative to move the braking member towards and away from the braking surface.

BACKGROUND OF THE INVENTION

Automatic slack adjusters for maintaining a substantially constant clearance between a braking member and a rotatable braking surface to account for wear of either or both the braking member and the braking surface when the brake is in a released condition have been known for many years.

Brake assemblies of the type of particular interest herein generally feature a thrust member operative to move the braking member towards and away from the braking surface in response to corresponding application and release of the brake by an operator. Such brake assemblies are commonly used in vehicular brake applications where the braking member includes a frictional material that is urged against a rotating surface such as a disc surface for a disc type brake or a wheel drum surface in the case of a conventional brake. Wear of the frictional material results in increased clearance between the braking member and the braking surface resulting in greater movement of the thrust member being required in order to apply the brake. Adjustment of the position of the thrust member to account for such wear is commonly accomplished by an adjustment nut threadingly engaged with the thrust member that is caused to rotate upon application of the brake by an operator and enable the thrust member to advance the braking member towards the braking surface a distance sufficient to make up for any increase in clearance between the braking member and the braking surface arising from wear.

Automatic slack adjusters particularly adapted for vehicular brakes are respectively disclosed in U.S. Pat. Nos. 3,428,154; 4,085,830; 4,088,206; 4,094,390; 4,164,272; and Re. 26,965, the disclosures of all of which are included herein by reference. The problem common to all of such prior art slack adjusters, however, is their respective complex and costly designs resulting in a need to provide an effective automatic brake slack adjuster that is low cost, simple in design and that can be easily adjusted and maintained.

SUMMARY OF THE INVENTION

Accordingly, it is an object of this invention to provide an automatic brake slack adjuster.

It is another object of this invention to provide an automatic brake slack adjuster that is simple in design and inexpensive to manufacture and maintain.

It is a further object of this invention to provide a low cost brake slack adjuster that is particularly advantageous for use in conjunction with vehicular brake assemblies.

BRIEF DESCRIPTION OF THE DRAWINGS

FIG. 1 shows a partially cut-away side elevation view of an embodiment 60 of the automatic brake slack adjuster of the invention;

FIG. 2 shows a view 40—40 of a preferred engagement means between parts of adjuster 60 of FIG. 1; and.

FIG. 3 shows view 23—23 of a component of adjuster 60 of FIG. 1.

DESCRIPTION OF THE PREFERRED EMBODIMENT

Automatic slack adjuster 60 of FIG. 1 has a thrust member 2 moveable axially in opposite directions within chamber 8 of a housing 10. Thrust member 2 is operative to move braking member 4 against and away from rotatable braking surface 6 upon respective application and release of the brake by an operator. Braking surface 6 is a rotatable surface such as a vehicular wheel disc that is stopped by frictional forces created by urging braking member 4 thereagainst. Braking member 4 is commonly provided with a layer 8 of frictional braking material suitable for the particular application involved.

As shown in FIG. 1, the brake is in a released condition with a desired clearance "C" between frictional material layer 5 and rotatable braking surface 6. Repetitive braking will cause the frictional material to wear and consequently cause clearance "C" to gradually increase making it necessary to move thrust member 2 correspondingly greater axial distance towards surface 6 in order to urge layer 5 thereagainst.

Although other means may be used to operatively couple thrust member 2 to a brake pedal or the like that is depressed or released by the operator, FIG. 1 shows a method commonly used in the form of cam 18 that is operative to move member 2 towards the viewer's left upon upward movement of member 18 that is operatively coupled to a brake pedal (not shown) by member 20 or other suitable means. Upon release of the brake pedal, biasing means such as coiled spring 3 disposed between housing 10 and an adjustment nut 12 hereinafter described is operative to move thrust member 2 towards the viewer's right.

Adjustment nut 12 is disposed coaxially about thrust member 2 within chamber 8 as shown in FIG. 1. At least a portion of an outer surface of thrust member 2 is threadingly engaged with adjustment nut 12 by means of threads 14. Rotation of adjustment nut 12 in opposite directions causes thrust member to correspondingly move in opposite axial directions within chamber 8 of housing 10. Preferably, clockwise rotation of adjustment nut 12 (when viewed from the end of thrust member 2 operatively connected to cam 18) causes thrust member 2 to move axially toward the viewer's left. Understandably, automatic rotation of adjustment nut 12 can be used to advantage to maintain the desired clearance "C" between frictional layer 5 and braking surface 6 in the brake released condition. The means by which adjustment nut 12 is automatically rotated in opposite directions upon respective application and release of the brake by the operator constitutes the slack adjuster of the invention hereinafter described with respect to drive member 22 and reaction member 30.

Drive member 22 is disposed coaxially about adjustment nut 12 as shown in FIG. 1. Drive member 22 is moveable axially and rotatably with respect to adjustment nut 12 and has a rotational axis "R" that is also the rotational axis of adjustment nut 12. Drive member 22 has a helical groove 28 that extends along an outer surface thereof facing housing 10 as more fully described hereinafter with respect to FIG. 3.

Drive member 22 has a section or portion 26 thereof that extends radially inwardly towards adjustment nut 12 having a substantially annular surface 27 that is spaced-apart from and faces a substantially annular surface 38 of a shoulder of adjustment nut 12 that faces toward the viewer's left to provide a substantially annular space 25 therebetween.

An adjustable constant force biasing means such as a constant force spring 36 is disposed in space 25 which presses against spaced-apart surfaces 27 and 38 and urges drive member 22 axially towards the viewer's left with an adjustable constant biasing force.

Preferably, a suitable thrust bearing 29 is disposed between spring 36 and surface 38 to enhance rotation of drive member 22 about adjustment nut 12.

Thus, drive member 22 is carried by and caused to move along with adjustment nut 12 and thrust member 2 in opposite axial directions upon application and release of the brake by the operator and is caused to rotate by drive pin member 42 extending from housing 10 into helical groove 28 in drive member 22.

As shown in FIG. 3, helical groove 28 is disposed at a preselected inclination angle $\theta$ from rotational axis "R". Upon application of the brake by the operator movement of drive member 22 towards the viewer's left causes wall 35 of groove 28 to impinge upon pin 42 and impart a rotational torque "RT" upon drive member 22 as well as an axial force "X" in a direction opposite to the direction of the constant biasing force against drive member 22. Torque "RT" causes drive member 22 to rotate in a direction enabling thrust member 2 to maintain desired clearance "C" which in the case of adjuster 60 is a clockwise direction when viewed from the end of thrust member 2 operatively connected to cam 18. The angular degree of rotation and the amount of rotational torque RT on drive member 22 is a function of inclination angle $\theta$. The value of axial force "X" is proportional to rotational torque "RT" and is likewise dependent upon the inclination angle $\theta$ selected.

Upon release of the brake by the operator, movement of thrust member 2 and adjustment nut 12 towards the viewer's right causes drive member 2 to move towards the viewer's right causing pin 42 to impinge upon wall 31 of groove 28 and impart a counter-rotational torque "CRT" that causes drive member 2 to rotate in an opposite counter-clockwise direction as well as impart an axial force "Y" on member 22 that is in the same direction as the constant axial biasing force against drive member 22 toward reaction member 30 hereinafter described.

The value of axial force "Y" is proportional to the value of counter-rotational torque "CRT" which is a function of the particular inclination angle $\theta$ selected.

Thus, a net axial force upon drive member 22 comprising the difference between the adjustable constant biasing force and opposite axial force "X" occurs upon application of the brake by the operator and an opposite net axial force upon drive member 22 comprising the sum of the adjustable constant biasing force and axial force "Y" occurs upon release of the brake by the operator. The value of the respective net forces is a function of the particular biasing force selected in conjunction with the particular inclination angle $\theta$ selected for groove 28. The value of the net axial force upon drive member 22 upon application of the brake by the operator causing drive member 22 to move axially toward the viewer's left as well as rotating clockwise is selected so as to urge member 22 against hereinafter described reaction member 30 with sufficient force to transmit rotational torque RT sufficient to rotate reaction member 30 in the same clockwise direction and cause adjustment nut 12 to rotate and cause thrust member 2 to advance in an axial direction towards the viewer's left to maintain desired clearance "C".

Reaction member 30 is disposed about adjustment nut 12 in spaced-apart relationship from drive member 22. Reaction member 30 is secured to adjustment nut 12 by engagement means that prevents axial movement of member 30 with respect to adjustment nut 12 and enables member 30 to rotate adjustment nut 12 at least in a direction causing thrust member 2 to advance axially to maintain desired clearance "C" upon application of the brake by the operator.

Drive member 22 is preferably provided with torque transmitting means in the form of a substantially annular surface 37 facing towards reaction member 30. Reaction member 30 is preferably provided with torque receiving means in the form of substantially annular surface 32 facing towards surface 37. The previously described biasing force against drive member 22 urges surface 37 into a constant engaged relationship with surface 32 enabling drive member 22 to transmit rotational torque "RT" to reaction member 30 sufficient to overcome rotational inertia of members 22 and 30 as well as adjustment nut 12 enabling all of them to rotate in a direction which, for adjuster 60, is a clockwise direction causing thrust member 2 to advance axially towards the viewer's left to maintain desired clearance "C" between frictional layer 5 and braking surface 6 upon application of the brake by the operator.

At least one or both of surface 32 and 37 is preferably provided with a layer 33 of suitable frictional material where it is desired to rotate member 30 in opposite directions in response to the corresponding rotational direction of drive member 22. Where it is desired for drive member 22 to rotate reaction member only in one direction, a suitable face ratchet arrangement may be employed.

At least one of the engagement means securing reaction member 30 to adjustment nut 12 and the combination of the reaction member torque receiving means and the drive member torque transmitting means must cause reaction member 30 and adjustment nut 12 to rotate in a direction causing thrust member 2 to advance in an axial direction to maintain desired clearance "C". Thus, if reaction member 30 is fixedly secured to adjustment nut 12, the combination of the reaction member receiving means and the drive member transmitting means must be adapted such as by a one-way clutch such as shown in FIG. 2 to rotate member 30 only in a direction enabling thrust member 2 to advance axially in a direction to maintain clearance "C" in response to rotation of member 22 and slip upon rotation in the opposite direction. Conversely, where reaction member 30 is secured to adjustment nut 12 by engagement means such as a one-way clutch shown in FIG. 2 enabling reaction member to rotate only clockwise which in the case of assembly 60 is the direction required to cause adjustment nut 12 to advance thrust member 2 axially towards the viewer's left to maintain clearance "C", the constant engaged relationship between surface 32 and 37 may be capable of rotating reaction member 30 in either direction such as by means of frictional material 33 disposed therebetween since member 30 can only be rotated in the clearance correcting direction. Preferably, the combination of the torque receiving means of member 30 and the torque transmitting means of member 22 is able to rotate member 30 in either direction and member 30 is secured to adjustment nut 12 by engagement means such as a one-way clutch enabling member 30 to rotate adjustment nut 12 only in a direction causing thrust member 2 to advance axially in the direction required to maintain clearance "C" which is towards the viewer's left in FIG. 1.

FIG. 2 shows a preferable engagement means between reaction member 30 and adjustment nut 12 in the form of a one-way clutch well known in the art, for which member 30 is provided with a smooth inner surface and nut 12 is provided with teeth 50 on its outer periphery facing towards the inner surface of member 30 and rocker members 52 are disposed on the ramps of teeth 50. The arrangement shown in FIG. 2 enables member 30 to rotate adjustment nut 12 only in a clockwise direction when viewed from the cam 16 end of thrust member 2 and to slip upon rotation of member 30 in a counter-clockwise direction.

In operation of adjuster 60, the clearance "C" between the braking member and the rotatable braking surface is the desired clearance in the brake released condition with both the drive member and reaction member at rest with the drive pin at an initial position within the helical groove 28 of the drive member. The biasing force and inclination angle $\theta$ are selected such that the net force urging the torque transmitting means of drive member 22 into constant engaged relationship with the torque receiving means is sufficient to enable clockwise rotation of drive member 22 upon application of the brake by the operator to cause member 22 to rotate an angular amount necessary to advance thrust member 2 the axial distance required to maintain clearance "C" in addition to transmitting rotational torque to reaction member 30 required to rotate member 30 and cause adjustment nut 12 to both rotate clockwise and advance thrust member 2 towards the viewer's left the axial distance required to maintain clearance "C" in the brake released condition.

Upon engagement between frictional layer 5 and rotatable braking surface 6 opposite axial force "X" of pin 42 on wall 31 of groove 28 increases sharply causing the net axial force of the torque transmitting means of drive member 22 against the torque receiving means of reaction member 30 to fall below the value required to rotate member 30 so that the rotation of member 30 stops even though member 22 may continue rotating providing a slipping engagement therebetween.

Even though drive member 22 rotates in an opposite counter-clockwise direction upon release of the brake by the operator in response to axial movement of thrust member 2 towards the viewer's right caused by spring 3, such rotation is unable to rotate member 30 in a counter-clockwise direction causing adjustment nut 12 to do likewise due to at least one of the engagement means between member 30 and adjustment nut 12 and the combination of the drive member torque transmitting means and the reaction member torque receiving means having been adapted to rotate member 30 only in the clockwise direction and otherwise slip sufficiently so as not to rotate member 30 in the counter-clockwise direction when viewed from the cam 18 end of thrust member 2 the result of which returns the pin member to its initial position within the drive member helical groove without rotating the adjustment nut in a counter-clockwise direction.

The various components of the slack adjuster of the invention may be made from any material or materials suitable for the particular brake application involved and the previously described adjustable constant biasing force and groove inclination angle $\theta$ are easily selectable to rotate the drive member the angular amount required to advance the thrust member the axial distance required to maintain clearance "C" upon application of the brake by the operator in addition to insuring that the previously described net axial force of the drive member on the reaction member is sufficient to enable the drive member to rotate the reaction member the angular amount required.

What is claimed is:

1. An automatic slack adjuster for maintaining a substantially constant clearance between a rotatable braking surface and a braking member of a brake assembly in a brake released condition, said assembly of the type including an elongate thrust member having a longitudinal axis and moveable axially in opposite directions within a housing chamber and operative to move the braking member against and away from the braking surface upon respective application and release of the brake by an operator, said thrust member having at least a portion of an outer surface thereof threadingly engaged with threads of an adjustment nut disposed coaxially thereabout that is adapted upon rotation to advance the thrust member in a direction and for a distance necessary to maintain the desired clearance between the braking member and the braking surface in the brake released condition, and said slack adjuster comprising:

a drive member having a rotational axis disposed within the housing coaxially about the adjusting nut and both rotatable and moveable axially with respect thereto, said drive member having torque transmitting means and at least one helical groove extending axially along a surface thereof facing towards the housing at a preselected inclination angle from the rotational axis thereof, a reaction member disposed coaxially about the adjusting nut in spaced-apart relationship to the drive member, said reaction member having torque receiving means facing towards the drive member torque transmitting means and secured to the adjustment nut by engagement means adapted to prevent axial movement with respect thereto in addition to an ability to rotate the adjustment nut at least in a direction causing the thrust member to maintain the desired clearance between the braking member and the braking surface upon application of the brake by an operator, means for biasing the drive member axially toward the reaction member and maintaining a constant engaged relationship between the drive member torque transmitting means and reaction member torque receiving means and providing a preselected substantially constant biasing force therebetween, a drive pin member extending from the housing into the drive member groove and adapted to be impinged upon by a wall of the groove upon axial movement of the drive member upon application of the brake by the operator and impart a rotational torque thereto that is a function of the groove inclination angle and causes the drive member to rotate in a direction enabling the thrust member to advance to maintain the desired clearance between the braking member and the braking surface in addition to an axial force thereagainst in a direction opposite to the direction of the biasing force that is proportional to the rotational torque and to be impinged upon by an opposite wall thereof upon opposite axial movement of the drive member upon release of the brake by the operator and impart a counter-rotational torque thereto that is a function of the groove inclination angle and causes the drive member to rotate in an opposite direction in addition to an axial force thereagainst in the direction of the biasing force that is proportional to the counter-rotational torque, and said biasing force and said helical groove inclination angle selected such that the biasing force is sufficiently greater than the opposite axial force upon application of the brake by the operator to provide a net axial force of the drive member torque transmitting means against the reaction member torque receiving means sufficient to enable the rotational torque of the drive member to be transmitted to the reaction member and cause the reaction member to rotate the adjustment nut an angular amount sufficient to advance the thrust member the axial distance required to maintain the desired clearance between the braking member and the braking surface up to the point of engagement therebetween at which the opposite axial force upon the drive member increases to diminish the net axial force of the drive member torque transmitting means against the reaction member torque receiving means sufficiently to prevent the rotational torque from being transmitted from the drive member to the reaction member resulting in a slipping engagement therebetween with rotation of the drive member in an opposite direction upon release of the brake by the operator being unable to rotate the adjustment nut in an opposite direction due to at least one of said reaction member engagement means and combination of said torque receiving means and said torque transmitting means being adapted to rotate the adjustment nut only in the direction causing the thrust member to advance to maintain the desired clearance between the braking member and the braking surface.

2. The slack adjuster of claim 1 wherein the adjusting nut is provided with a shoulder having a substantially annular surface facing towards the braking member, the drive member has a substantially annular surface that is spaced-apart from and faces away from the reaction member towards said shoulder surface defining a substantially annular space therebetween, and said biasing means is disposed in said space in such a manner as to bear against said adjusting nut surface and urge said drive member torque transmitting means into said constant engaged relationship with said reaction member torque receiving means.

3. The slack adjuster of claim 2 wherein said drive member surface facing away from the reaction member is a surface on one side of a portion of the drive member that extends radially inwardly towards the adjusting nut and the drive member torque transmitting means is a substantially annular surface on the opposite side of said portion facing towards the reaction member and the reaction member torque receiving means is a substantially annular surface of said reaction member facing towards said drive member.

4. The slack adjuster of claim 1 wherein the constant engaged relationship between said drive member torque transmitting means and reaction member torque receiving means is a frictionally engaged relationship.

5. The slack adjuster of claim 3 wherein the constant engaged relationship is a frictional engaged relationship provided by a frictional material disposed on at least one of said reaction member and said drive member annular facing surfaces.

6. The slack adjuster of claim 2 including a thrust bearing disposed between the biasing means and the adjusting nut shoulder surface to promote rotation of said biasing means in conjunction with rotation of said drive member.

7. The slack adjuster of claim 1 wherein the engagement means between the adjusting nut and the reaction member is a frictional engagement means.

8. The slack adjuster of claim 7 wherein the frictional engagement means is provided by a frictional material disposed on at least one of said reaction member and said adjusting nut.

9. The slack adjuster of claim 1 wherein the engagement means between the reaction member and the adjustment nut is a one-way clutch adapted to enable the reaction member to rotate the adjustment nut in a direction causing the thrust member to move towards the braking surface and to slip upon rotation of the reaction member in an opposite direction.

* * * * *